United States Patent [19]

Eweson

[11] 3,930,799
[45] Jan. 6, 1976

[54] APPARATUS FOR MAKING ORGANIC FERTILIZER

[76] Inventor: Eric W. Eweson, 465 Park Ave., New York, N.Y. 10022

[22] Filed: July 23, 1974

[21] Appl. No.: 490,955

Related U.S. Application Data

[63] Continuation-in-part of Ser. No. 295,349, Oct. 5, 1972, abandoned.

[52] U.S. Cl. ............... 23/259.1; 241/284; 259/89
[51] Int. Cl.² .......................... C05F 3/06; B01F 9/06
[58] Field of Search ............... 23/259.1; 259/89, 3; 241/98, 176, 177, 178, 284, 99; 34/108, 109

[56] References Cited
UNITED STATES PATENTS

| | | | |
|---|---|---|---|
| 313,401 | 3/1885 | Breer | 259/89 |
| 2,994,592 | 8/1961 | Scovel | 23/259.1 |
| 3,224,839 | 12/1965 | Pierson | 23/259.1 |
| 3,235,369 | 2/1966 | Eweson | 71/9 |
| 3,245,759 | 4/1966 | Eweson | 23/259.1 |

Primary Examiner—Harvey C. Hornsby
Assistant Examiner—Alan Cantor
Attorney, Agent, or Firm—Nichol M. Sandoe, Esq.

[57] ABSTRACT

In an apparatus for making organic fertilizer from waste organic materials by aerobic fermentation, the interior of an inclined slowly rotating digester cylinder is provided with a series of knives which gradually cut and shred the softer components of the raw material and a series of heavy chains located downstream from said knives, which said chains have overlapping loops which crush and grind hard and brittle components of the raw material, all while the material is in process of aerobic fermentation. Materials which resist the comminuting action of both the knives and chains are discharged with the digested organic materials and are then separated therefrom. The apparatus is capable of accepting and treating municipal garbage and refuse without prior separation of unwanted material, and without preliminary grinding of the material prior to its introduction into the digester.

3 Claims, 6 Drawing Figures

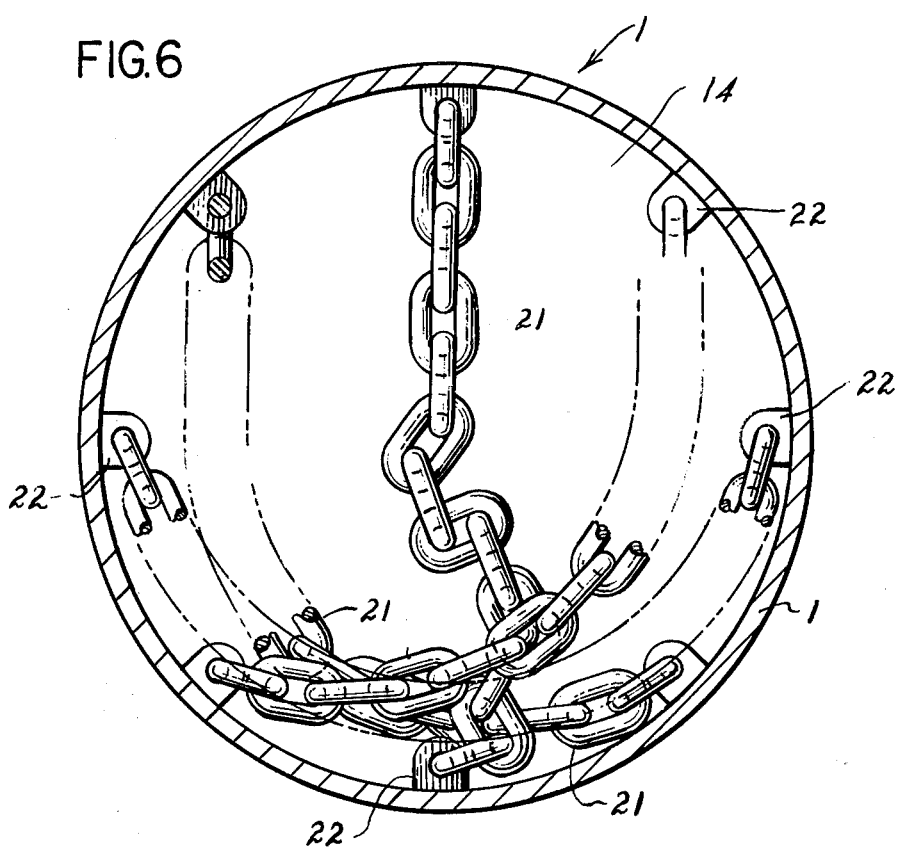

APPARATUS FOR MAKING ORGANIC FERTILIZER

This application is a continuation-in-part of my copending application Ser. No. 295,349, filed Oct. 5, 1972, now abandoned.

This invention relates to apparatus for making organic fertilizer, sometimes referred to as compost or humus, from organic waste materials by aerobic fermentation thereof. Suitable organic waste materials are municipal garbage and refuse, sewage wastes, farm wastes such as corn cobs, straw, manure and animal bedding, feed lot wastes, canning plant wastes and the like. A prime source of the materials is the municipalities where, in many cases, the disposal of garbage and refuse materials is an increasingly critical problem. Many municipalities have relied on incineration, but this is now being frowned upon because of the resulting air pollurtion. Other municipalities have resorted to dumping at sea, or to trucking such materials over long distances for dumping in remote places. Both practices are expensive and unsatisfactory. Aerobic fermentation of such materials, on the other hand, can be practiced within or close to the territorial limits of most municipalities since it produces little or no pollution of either air or water, and produces a useful compost or humus product which is saleable.

Various processes for the aerobic fermentation of such materials have been proposed, but although some have been capable of reasonably satisfactory operation, and are capable of producing a satisfactory product, they have met with only limited commercial success because of expense. One such process is disclosed in my prior U.S. Pat. Nos. 3,138,447 and 3,235,369. One of the principal obstacles to the successful use of such processes for the digestion of municipal garbage and refuse has been the problem and expense of handling and segregating of certain predominantly inorganic materials normally found in garbage and refuse, such as metal objects which are frequently of considerable size and weight, including metal cans, flatirons and discarded automobile parts such as old mufflers and oil filters, glass and ceramic objects, bricks, stones, rubber and plastic objects, and the like.

In most plants for carrying out such processes, it has been the practice to separate out some salvageable materials and some useless inorganic materials from the raw garbage and waste materials as delivered to the plant, leaving a residue for further processing. Then, it has been common practice to subject such residue to a preliminary grinding or shredding action to reduce the components of the residue to suitable size for efficient microbial action prior to introducing them into the digester. However, the grinding and shredding operation has proven to be very expensive and troublesome for the grinding machines are not only costly and expensive to operate, but also they are frequently damaged by objects which have escaped the preliminary separation. See, for example, the volume entitled Gainesville Compost Plant, An Intermim Report published in 1969 by the U.S. Department of Health, Education, and Welfare, Public Health Service, Consumer Protection and Environmental Health Service, Environmental Control Administration, Bureau of Solid Waste Management. This report details the problems and expense of segregating and removing the unwanted materials from the original mass. In my prior patents above referred to, I proposed a combined preliminary screening and grinding operation to separate out and dispose of such materials, prior to introducing the organic residue into the digester.

According to the present invention, it is intended that the aerobic fermentation process be carried out substantially as described in my prior patents. Moreover, the apparatus will be substantially similar to that disclosed in my prior patents in that, as hereinafter described, I propose the use of a rotary cylindrical digester in which optimum conditions for the propagation of the aerobic bacteria may be created and maintained. The axis of rotation of the digester is tilted at an angle to the horizontal to facilitate movement of material through the cylinder and to discharge the processed material therefrom.

It is an object of the present invention to construct the digester in such manner as to enable it to accept municipal garbage and refuse substantially as delivered to the plant by the standard types of compacting collection trucks. No prior separation of unwanted materials would be required, except perhaps to remove occasional exceptionally large objects such as furniture, automobile tires, mattresses, or very large metal objects, or wooden boxes or crates. No preliminary grinding would be required.

It is a further object of the invention to equip the interior of the digester with means for mechanically disintegrating the constituent components of the raw materials during the progress of the aerobic fermentation. For this purpose, I equip the interior of the digester with means for cutting and shredding the softer components of the mass such as paper and paper board, food wastes, textiles and the like to reduce them to a size suitable for efficient action thereon by the aerobic microorganisms. I also equip the interior of the digester with means to crush and grind hard or brittle components such as glass, ceramics, rock and the like to reduce a considerable portion of such components to a size which is tolerable in the finished compost product, i.e., to a granular size capable of passing through a mesh screen having 16 openings per square inch, sometimes referred to as a 4 mesh screen, for example. In some circumstances, depending on the nature of the components of the raw materials, the knives may be dispensed with, and the grinding action of the chains alone may be relied upon to reduce the components to the desired size.

In the use of the apparatus, the aerobic activity is largely completed by the time the material enters a final compartment of the cylinder which may be used as a partial drying compartment in which the moisture content of the material is reduced to about 35%. Thus, the material which is discharged at the discharge end of teh digester consists of a partially dried mass including composted organic material, and a small quantity of undigested inorganic material. The latter will consist of a variety of small pieces of glass, ceramics, rock and the like which have been crushed or ground to small granular size, and a variety of larger pieces, particularly of metal, plastics or rubber which have resisted both the cutting and shredding action and the crushing or grinding action.

Therefore, in order to dispose of the larger pieces, the discharged material is carried to a separator such as a vibrating screen, for example, which separates and discards the larger pieces, leaving as screenings the composted organic material mixed with the small granular inorganic material which is not only not harmful, but may be beneficial in reasonable quantities.

Other objects and advantages of the invention will appear hereinafter.

A preferred embodiment of the apparatus selected for purposes of illustration is shown in the accompanying drawings, in which:

FIG. 6 is a section on the line 6—6 of FIG. 1.

Figure 1:
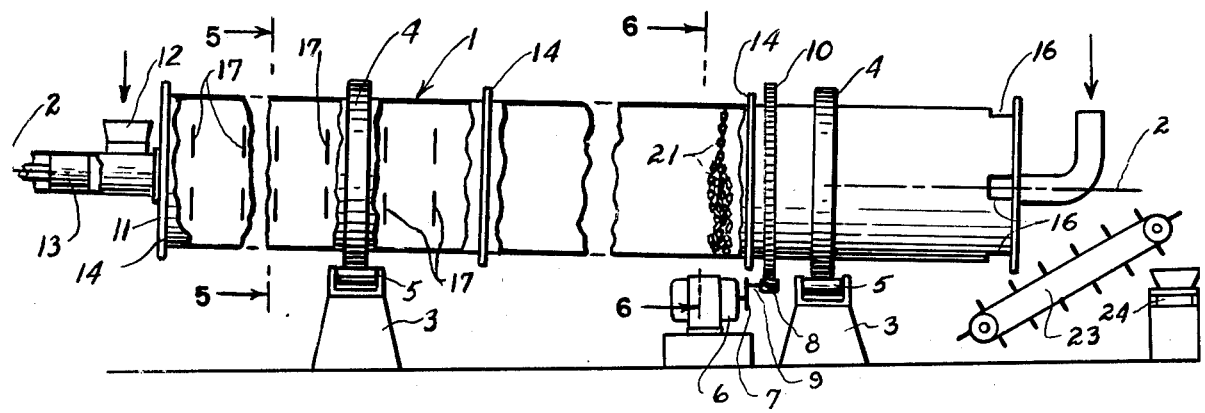
FIG. 1 is a side elevation of the apparatus, partly in section.

Referring to the drawings, the digester apparatus comprises a cylindrical drum 1 mounted for rotation about a longitudinal axis 2 which is tilted slightly to the horizontal to facilitate slow movement of material through the digester as the drum rotates. The drum is supported on a plurality of bearing blocks 3 and is provided with annular rails 4 which ride on rollers 5 on the bearing blocks. The drum may be rotated by a motor 6 having a reduction gear 7 connected thereto which has a pinion 8 mounted on shaft 9 which meshes with the annular ring gear 10 on the drum.

For reason which will appear hereinafter, the dimensions of the drum and its rate of rotation are of some importance, not only to provide sufficient time for substantial completion of the aerobic fermentation as the material moves slowly through the drum, but also to cause the cutting, shredding and crushing devices to operate efficiently as hereinafter described.

Thus, in an apparatus embodying the present invention now in satisfactory operation in Pleasant Hill, Iowa, the digester drum is a cylinder 11 feet in diameter and 120 feet long. Raw material is introduced to a depth approximately 6 feet to 9 feet. Water or wet sewage sludge may also be introduced to maintain a moisture content of 45% to 55% as required for active aerobic fermentation. In a typical operation, a charge of raw material for a drum of these dimensions might consist of 30 tons of municipal garbage and 10 tons of raw sewage sludge, for example. A suitable bacterial culture may also be introduced. The rate of rotation of the drum has averaged approximately 25 revolutions per hour. From observation of the apparatus in operation, I have concluded that the diameter of the drum should not be less than 9 feet and that the depth of the material therein should not be less than 5 feet to insure efficient cutting, shredding and grinding action. The diameter of the drum and the depth of the material therein may, of course, be increased, depending on the volume of the raw material to be treated. I have also concluded that the rate of rotation of the drum should not be less than 10 revolutions per hour for efficient operation. A rate of 20 to 30 revolutions per hour is preferred, although a higher rate not exceeding 60 revolutions per hour may be used if desired. Higher rates of revolution will, however, reduce the efficiency of the biological process.

The end plate 11 which closes the inlet end of the drum is provided with an opening to receive the raw material which is introduced into the drum through a stationary hopper 12 having an inlet opening of large size to accomodate the usual run on municipal garbage and rubbish, excepting only exceptionally large and unwieldy pieces. A hydraulic ram 13 of conventional construction may be located at the bottom of the hopper to shove the material from the hopper into the drum.

As in my prior patents above referred to, I prefer that the interior of the drum be provided with a plurality of transverse partitions 14 which divide the interior into a plurality of compartments within which the desired climatic conditions for optimum bacterial activity may be maintained in the manner described in said patents. In the Iowa installation previously referred to, there are two partitions which divide the drum into three compartments. As processing continues, the material is allowed to move in stages toward the discharge end of the drum, moving from one compartment to the next through apertures 15 in the partitions 14 under controlled conditions as described in said patents. Raw material is introduced at the inlet end of the drum and composted material (mixed with some trash as previously described) is discharged through apertures 16 in the cylindrical wall of the drum in the last compartment.

Figure 4:
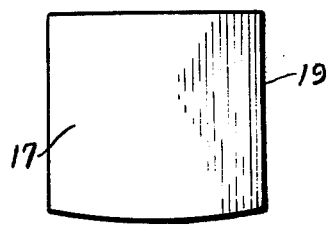
FIGS. 2, 3 and 4 are elevations of various forms of cutting blades.
Figure 3:
Figure 2:
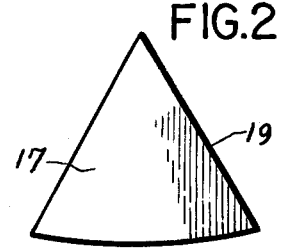
Figure 5:
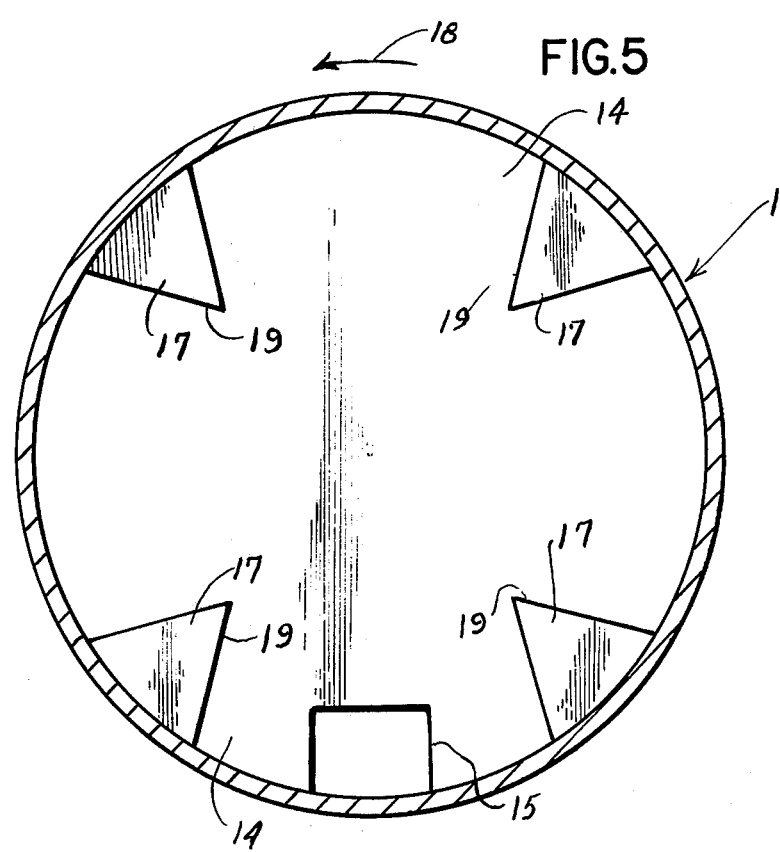
FIG. 5 is a section on the line 5—5 of FIG. 1.

In order to cut or shred the material in the drum, a multiplicity of knives 17 are mounted on the interior wall of the drum extending inwardly toward the axis. In FIG. 1 of the drawings only the first compartment is shown as equipped with such knives, but it will be understood that the second compartment may be so equipped, if desired. The knives may be of various shapes as shown in FIGS. 2, 3 and 4, although I prefer the shape shown in FIG. 2. Such knives are mounted in planes perpendicular to the axis of rotation and move in the direction indicated by the arrow 18 so that as the drum rotates the cutting edges 19 push slowly through the material with a very effective cutting action. The knives may be made of standard steel plate of a thickness of ⅛ inch to ¼ inch with the cutting edges sharpened. Hardened steel may be used if desired, or the cutting edges may be hardened or edged or capped with hardened steel. If desired, the cutting edges may be serrated.

Preferably, the knives are arranged in circumferential rows, as shown, or they may be staggered. Rows may be spaced apart from 1 foot to 2 feet. Knives according to FIG. 2 having cutting edges approximately 2 feet long may be spaced circumferentially by approximately 2 feet to 4 feet. The base edges of the knives may be curved slightly to fit the contour of the cylindrical wall, and the knives may be welded to the wall along those edges.

It is necessary to understand that the cutting and shredding of the softer components of the material results solely from the action of the knives as they move with the material. That is, as the drum rotates, the surface of the material assumes an angle of about 45° to the horizontal, and the material on the high side peels away from the cylinder and rolls down to the low side where it falls onto the exposed knives. Then, as rotation continues, the material which is stapled over the edges of the knives is torn and shredded as the increasing weight of the falling material compacts the lower material and forces it downwardly. The knives do not work against any fixed edge and there is no shearing or scissors action. It is necessary to understand, too, that the material is a wet mass having a moisture content of 45% or 55%, and that the mass is maintained by the microbial activity at a temperature of 135° to 170°F. during processing. Under these conditions, and taking into consideration the depth of the material, the knives cut or shred the useful soft organic material including food wastes, paper, paper board, textiles and the like, and at the same time merely shove aside the harder and tougher materials such as metals, plastics, glass, rocks, bricks and the like.

In order to deal with the latter, a series of heavy chains are preferably located downstream from the inlet end of the drum and from the knives. Thus, as shown, chains 21 are mounted near the downstream end of the second compartment, although it will be understood that in practice they may be located in any convenient position within either the first or second compartment if desired. Such downstream location of the chains is preferred because they will perform their intended crushing and grinding functions more efficiently when the bulk of the softer material has been previously reduced to small pieces by the knives 17.

The length of the chains and the manner of mounting them is also of importance. Thus, the ends of each chain are attached to the wall of the drum at diametrically opposed positions 22 as shown in FIG. 6, and the length of each chain is slightly greater than the circumferential distance between the points of attachment to the wall in order to form a loose loop between the points of attachment. As shown in FIG. 6, four chains are provided with the eight points of attachment all lying in a plane perpendicular to the axis of rotation and spaced at 45°. Each chain is attached at points spaced at 180° and the length of each chain is slightly greater than one-half the circumference of the drum so that the loop of each chain partially overlaps the loop of each adjacent chain. Preferably, the chain is of the very heavy type used as anchor chains for mooring large ships. Typically, such chains are made up of links about 12 inches in length from stock at least 2 inches in diameter. Each link of such a chain will weigh in excess of 20 lbs.

Thus, as the drum rotates the overlapping portions of the loose loops of chain rub together and crush and grind material between them. The loops also crush and grind the material against the wall of the drum. The action is very effective in breaking up brittle materials such as glass and ceramics and it tends to break up and erode rocks, bricks, and the like. It also aids importantly in shredding the soft organic materials. Examination of composted material discharged from the drum shows only tiny granules of glass and ceramic materials.

Both the knives and the chains aid in continuously stirring the mass of the material in process to expose new surfaces, all of which aids in promoting the microbial activity and the breakdown of the raw materials.

In most operations, while the aerobic fermentation together with the combined action of the knives and chains will disintegrate substantially all of the useful organic material, they will fail to disintegrate some of the inorganic material and there will be a residue of such material of various sizes which must be separated from the composted material. For this purpose, various kinds of known equipment are available. For purposes of illustration, I have shown in FIG. 1, a conveyor 23 located below the drum in position to receive material discharged from the drum through the apertures 16. The conveyor drops the material onto a vibrating screen 24 of conventional construction. A mesh screen will provide satisfactory separation. Discarded material may be salvaged to be recycled or used for landfill.

I claim as my invention:

1. Apparatus for making organic fertilizer comprising a cylindrical drum having an inlet end and a discharge end, means for rotating said drum on a longitudinal axis tilted at an angle to the horizontal, a plurality of chains located within said drum, each of said chains having its ends mounted on the interior wall of the drum at diametrically opposed positions, the length of each chain being slightly greater than the circumferential distance between the points of attachment so as to form a loop therebetween, the points of attachment of each chain being spaced circumferentially from the points of attachment of other chains with the loop of each chain partially overlapping the loop of each adjacent chain, with all of said points of attachment lying substantially in a common plane whereby the loops of adjacent chains rub against each other as the drum rotates.

2. Apparatus as claimed in claim 1, including a multiplicity of knives mounted on the interior wall of said drum, said knives lying in planes perpendicular to the axis of rotation of said drum and extending inwardly toward the axis of rotation, and in which said chains are located between at least some of said knives and said discharge end.

3. Apparatus as claimed in claim 2 in which the interior of said drum is divided into a plurality of compartments by transverse partitions, each of which has apertures therein to permit passage of material from one compartment to the next, and in which said knives are mounted in a first compartment and said chains are mounted in a second compartment between said first compartment and said discharge end.

* * * * *